US005423524A

United States Patent [19]

Searle

[11] Patent Number: 5,423,524

[45] Date of Patent: Jun. 13, 1995

[54] LOW-PROFILE QUICK-RELEASE CLAMP

[75] Inventor: Stephen D. Searle, Lafayette, Calif.

[73] Assignee: TechMetric Machine Works, Inc., Concord, Calif.

[21] Appl. No.: 107,944

[22] Filed: Aug. 17, 1993

[51] Int. Cl.[6] ........ B23Q 1/04

[52] U.S. Cl. ........ 269/71; 269/82

[58] Field of Search ........ 269/71, 82, 45, 73, 269/285, 134–138

[56] References Cited

U.S. PATENT DOCUMENTS

| | | | |
|---|---|---|---|
| 1,192,267 | 7/1916 | Bond | 269/71 |
| 1,323,127 | 11/1919 | Treuthardt | 269/71 |
| 2,203,162 | 6/1940 | Lee | 269/71 |
| 3,043,587 | 7/1962 | Underhill | 269/71 |
| 4,422,628 | 12/1983 | Kasai | 269/71 |
| 4,577,846 | 3/1986 | Buchler | 269/82 |
| 4,822,014 | 4/1989 | Buchler | 269/71 |
| 5,019,129 | 5/1991 | Johanson | 269/71 |

*Primary Examiner*—Robert C. Watson
*Attorney, Agent, or Firm*—Limbach & Limbach

[57] ABSTRACT

An in-line arm assembly for releasably clamping a head-mounting fixture in a disk drive tester is disclosed. The in-line arm assembly includes a clamp housing, a movable gib, a removable head-mounting arm, a head-mounting fixture, and a means for moving the gib to activate and release the clamp. The clamp housing has a support surface and an inclined clamping surface. The gib is coupled to the clamp housing and has an inclined clamping surface. The head-mounting arm has a clamped member that engages the clamp with a bottom surface that is parallel to the support surface of the clamp housing and two opposing beveled surfaces that are parallel to the inclined clamping surfaces of the clamp housing and gib. The in-line arm assembly facilitates replacement of heads in the disk drive tester.

11 Claims, 4 Drawing Sheets

LOW-PROFILE QUICK-RELEASE CLAMP

BACKGROUND OF THE INVENTION

1. Field of the Invention

This invention relates generally to fixtures for use in testing disk drives, and relates more particularly to an in-line, low-profile fixture clamp that is useful for quickly changing a head-mounting arm.

2. Description of the Relevant Art

Certification testing of magnetic-recording disk drives involves using a fixture to position a test head or other device relative to a rotating disk. Both disks and heads can be tested. A positioning device, typically a linear or rotary actuator of some sort, is used to move the head in a radial or arcuate path across the area of the disk that is of interest. During certification testing, a disk can be changed by removing the disk from a spindle and loading another disk onto the spindle. Changing a head is somewhat more complicated because of the precise alignment needed between the head and data tracks recorded on the disk.

Prior fixtures used in disk and head certification testing were difficult and time-consuming to use. If a head needed to be changed, a head-mounting structure had to be unbolted from its headblock, then removed and replaced with another head-mounting structure holding a replacement head. The subsequent realignment of the head relative to the disk data tracks often consumed a great deal of time. The head could be aligned with the headblock clamp loosened, but the head would move out of alignment once the clamp was tightened to lock the head-mounting structure in place. As a result, the prior fixtures did not provide an adequate means for quickly and easily changing a head mount. The prior fixtures also did not provide a convenient means for adjusting the height of the head relative to the disk surface, relying on shims that had to be individually inserted or removed to change the height.

SUMMARY OF THE INVENTION

In accordance with the illustrated preferred embodiment, the present invention provides an in-line arm assembly for releasably clamping a head-mounting fixture in a disk drive component tester. The present invention improves upon a prior head-mounting structure by providing a removable head-mounting arm that is securely clamped in the arm assembly.

The arm assembly of the present invention comprises a clamp housing, a movable gib, a removable head-mounting arm, a means for moving the gib to activate and release the clamp, and a head-mounting fixture. The clamp housing has a tongue extending from one side thereof for mounting in a headblock and also includes a clamp portion for releasably coupling the head-mounting arm to the clamp housing. The clamp portion of the clamp housing has a recessed pocket open to a side opposite the tongue and has a support surface and a first inclined surface. The gib is coupled to the clamp housing in the pocket thereof opposite the first inclined surface and has a second inclined surface. The removable head-mounting arm includes a clamped member that has a bottom surface that is parallel to and mates with the support surface of the clamp housing and has two opposing beveled surfaces that are parallel to and mate with corresponding inclined surfaces of the clamp housing and gib. The head-mounting arm extends sideways from the pocket of the clamp housing when mounted in the clamp. The means for moving the gib is preferably a threaded shaft that engages a threaded hole in the gib. When the gib is moved into contact with the clamped member of the head-mounting arm, it clamps the clamped member between the support surface and inclined surfaces of the clamp housing and the gib. The head-mounting arm is released by rotating the shaft to move the gib out of contact with the clamped member. The head-mounting fixture is mounted to a distal end of the head-mounting arm. A head can be readily changed by removing and replacing the head-mounting arm.

The clamp of the in-line arm assembly of the present invention has a low profile and requires a small vertical space to operate, which is very useful with certification testers where room is limited. The head-mounting arm is securely and accurately positioned by the clamp. A damaged head can be quickly replaced, which is very important in a production environment where saving time reduces costs.

The features and advantages described in the specification are not all inclusive, and particularly, many additional features and advantages will be apparent to one of ordinary skill in the art in view of the drawings, specification and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

DETAILED DESCRIPTION OF THE PREFERRED EMBODIMENT

Figure 1:
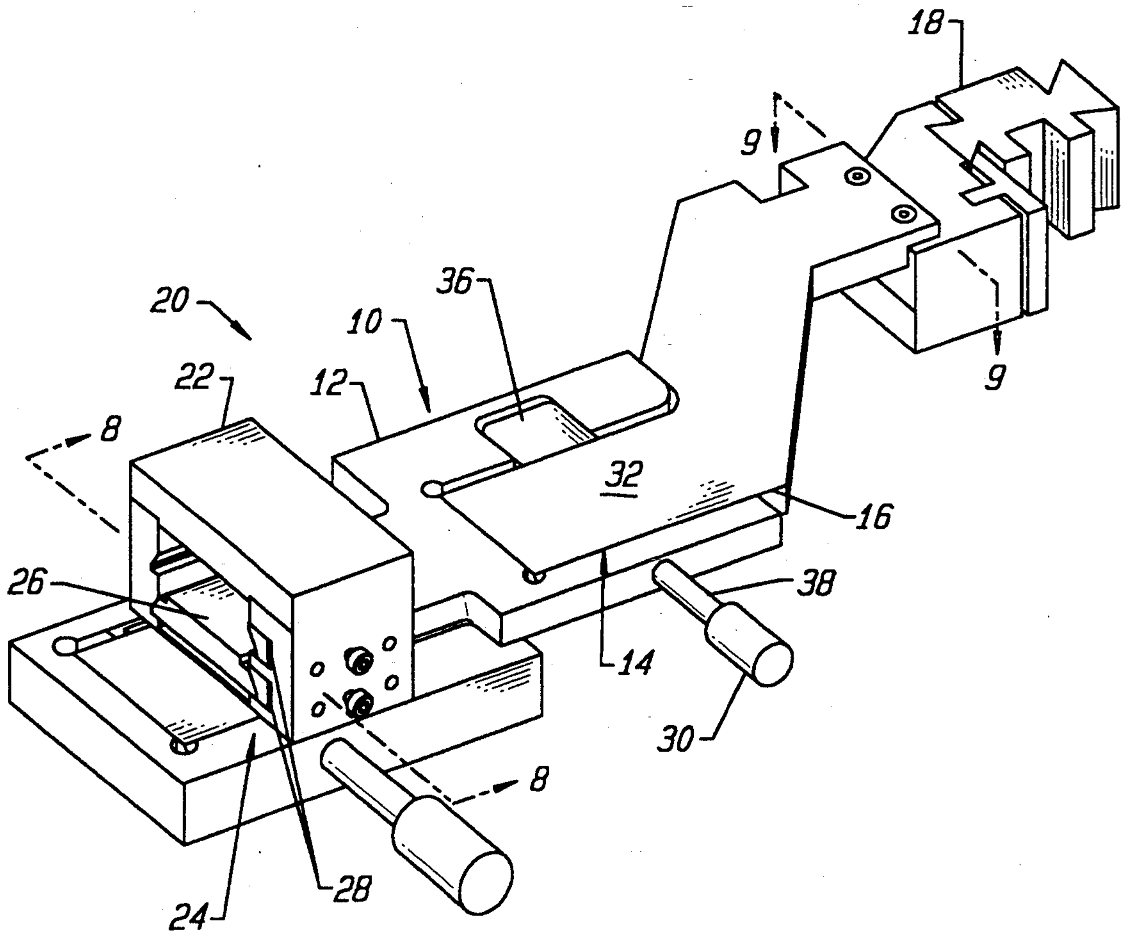
FIG. 1 is a perspective view of a disk test fixture that uses the in-line arm assembly of the present invention.

FIGS. 1 through 9 of the drawings depict various preferred embodiments of the present invention for purposes of illustration only. One skilled in the art will readily recognize from the following discussion that alternative embodiments of the structures and methods illustrated herein may be employed without departing from the principles of the invention described herein. The preferred embodiment of the present invention is an in-line arm assembly 10 used as part of a fixture for use in certifying disks and heads of magnetic-recording disk drives. The fixture 20 provides a means for mounting two heads used in certification testing or for any other purpose such as disk burnishing. As shown in FIG. 1, the in-line arm assembly 10 includes a clamp housing 12, a low-profile, quick-release clamp 14, a removable head-mounting arm 16, and a head-mounting fixture 18. The in-line arm assembly 10 provides a means for quickly changing heads attached to the head-mounting fixture 18.

As shown in FIG. 1, the fixture 20 used for a disk drive certification tester contains a headblock assembly 22 that carries two parallel in-line arm assemblies 10, only one of which is illustrated, for positioning heads (not shown) above and below the disk-under-test (not shown). The headblock assembly 22 is mounted onto an actuator (not shown) by a clamp 24. The actuator moves the fixture 20, along with its attached heads, relative to the disk-under-test. A head is secured to the head-mounting fixture 18 at the distal end of the in-line arm assembly 10.

The quick-release clamp 14 of the in-line arm assembly 10 allows either or both head-mounting arms 16 (each with a premounted head) to be replaced quickly and securely. A tongue 26 of the clamp housing 12 of the in-line arm assembly 10 projects from the proximal end thereof and is retained by one of two clamps 28 of the headblock assembly 22. A clamped member 32 of the head-mounting arm 16 fits into and is clamped in a pocket 34 (FIG. 2) that has been milled into the clamp housing 12. The top of the clamped member is preferably flush with the top of the clamp housing 12. The head-mounting arm 16 can be removed by turning a knob 30 and a shaft 38 to loosen a gib 36 of the clamp 14. Another head-mounting arm 16 with an attached head can then be installed by inserting its clamped member 32 into the clamp 14 and turning the shaft 38 to actuate the clamp. The in-line arm assembly 10 of the present invention allows individual heads to be replaced without disturbing the headblock 22 or the other head mounting.

Figure 2:
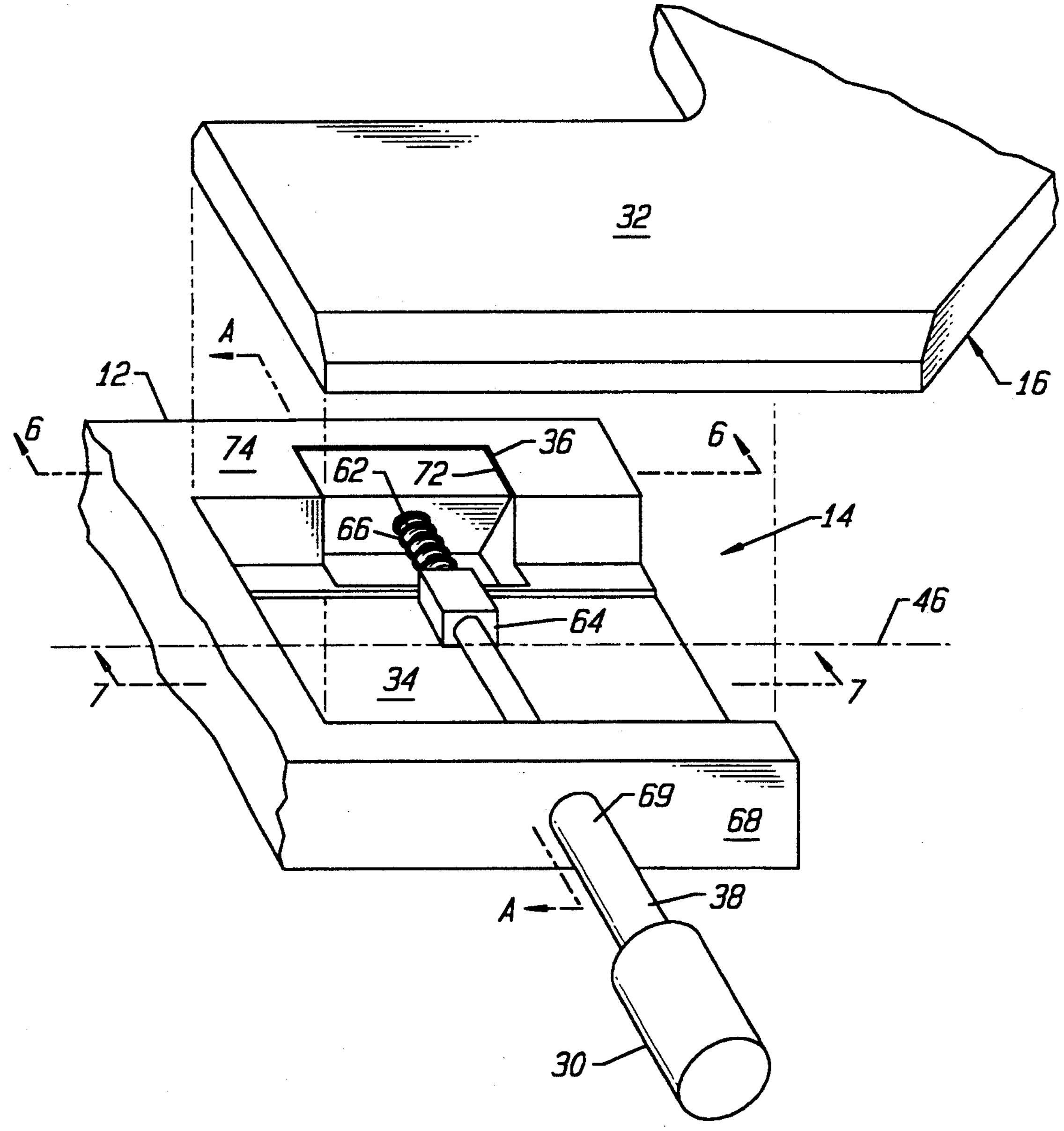
FIG. 2 is an exploded perspective view of a low-profile, quick-release clamp used in the in-line arm assembly of the present invention.

As shown in FIGS. 1 and 2, the clamp housing 12 provides on one side a tongue 26 that is secured into a clamp 28 of the headblock assembly 22 (FIGS. 1 & 8) and on the other side a clamping portion that includes the quick-release clamp 14. The head-mounting arm 16 includes a clamped member 32 on one side that can be clamped into the quick-release clamp 14, and on the other side the head-mounting fixture 18. When the clamp 14 is released, the head-mounting arm 16 and its attached head-mounting fixture 18 and head can be removed and replaced. In order to minimize the vertical dimension of the clamp 14 and head-mounting arm 16, one lateral side wall of the clamp housing 12 is cut away (FIGS. 2 & 7) to allow the head-mounting arm to extend laterally from the clamp.

Figure 3:
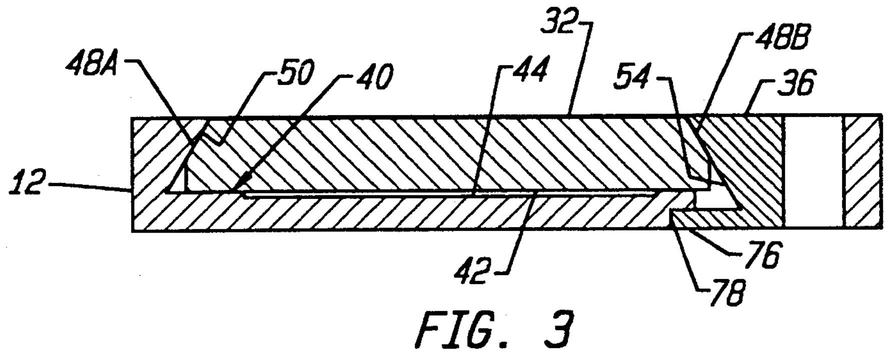
FIG. 3 is a sectional view of the clamp of FIG. along line A—A, showing the clamp in a clamped position.
Figure 4:
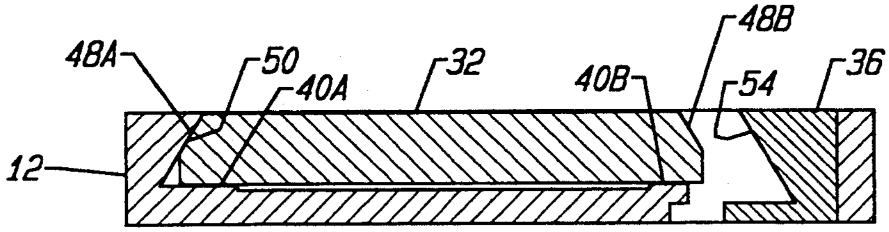
FIG. 4 is a sectional view of the clamp of FIG. 2 along line A—A, showing the clamp in an unclamped position.
Figure 5:
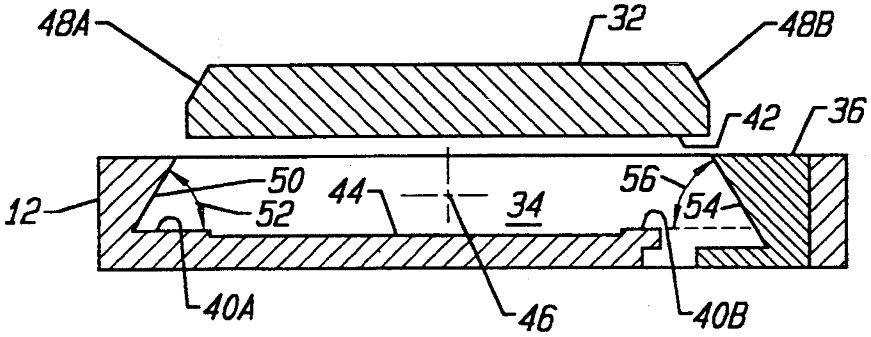
FIG. 5 is a sectional view of the clamp of FIG. 2 along line A—A, showing the clamp in an unclamped position and a clamped member removed therefrom.

As best shown in FIGS. 3–5, the clamp housing 12 has a support surface 40 that mates with a bottom surface 42 of the clamped member 32 of the head-mounting arm 16. In other words, the bottom surface 42 of the clamped member 32 rests on the support surface 40 of the clamp housing 12, which locates the clamped member in a vertical direction relative to the clamp housing. The support surface 40 of the clamp housing 12 is actually composed of two pads 40a and 40b (FIG. 5), with an undercut area 44 in between. The two pads 40a and 40b are preferably coplanar. Both the support surface 40 of the clamp housing 12 and the bottom surface 42 of the clamped member 32 are preferably flat and parallel to a clamp axis 46 (FIGS. 2 & 5).

The clamped member 32 is an integral part of the head-mounting arm 16, to which a head is mounted so that it is easily removable from the rest of the fixture 20. Two opposite lateral sides of the clamped member 32 are beveled at surfaces 48a and 48b. The beveled surfaces 48a and 48b are preferably flat and parallel to the clamp axis 46. One end of the clamp housing 12 has a first inclined surface 50 that projects outward from and forms an acute angle 52 (FIG. 5) with the support surface 40 of the clamp housing. On the other side of the clamped member 32, the gib 36 has a second inclined surface 54 that forms an acute angle 56 with respect to the support surface 40. The acute angles 52 and 56 are preferably 60°, as are the beveled surfaces 48a and 48b. Both the inclined surfaces 50 and 56 are preferably flat and parallel to the clamp axis 46.

Figure 6:
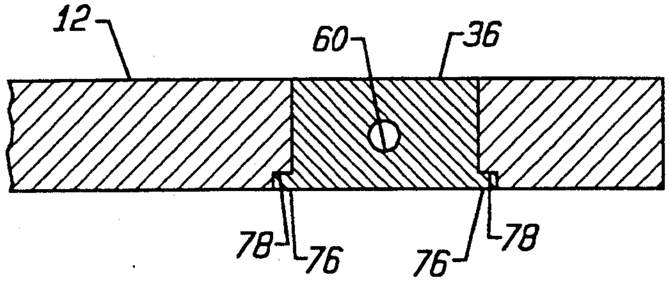
FIG. 6 is a sectional view of the clamp of FIG. 2 along line 6—6 through a gib used in the clamp.
Figure 7:
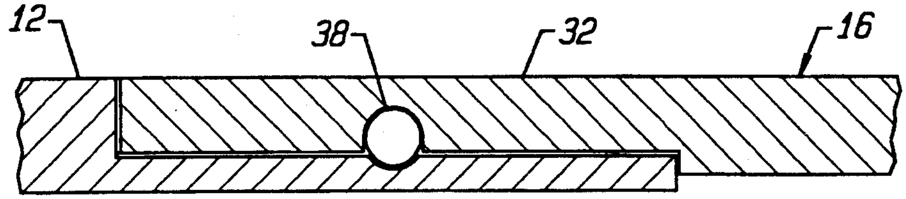
FIG. 7 is a sectional view of the clamp of FIG. 2 along line 7—7 through a clamped member of the clamp.

The function of the shaft 38 is to provide a means for moving the gib 36 into and out of contact with the clamped member 32 to activate and release the clamp. As generally shown in FIG. 2, the gib 36 has a threaded hole 60 (FIG. 6) that receives a threaded end 62 of the shaft 38. The threaded end 62 of the shaft 38 is guided by a guide block 64 that has a clearance hole therethrough for the shaft. A compression-type coil spring 66 is positioned on the threaded end of the shaft 38 between the gib 36 and the guide block 64 and acts to bias the gib to the right as viewed in FIGS. 3–5. The shaft 38 extends parallel to the support surface 40 of the clamp housing 12 in a direction perpendicular to the clamp axis 46, and extends out through a clearance hole in a side wall 68 of the clamp housing. The portion of shaft 38 that extends outwardly of the clamp housing 12 has a larger diameter than the portion of the shaft that extends through the side wall 68 and across the bottom of the clamp housing 12. A shoulder 69 on the shaft 38 contacts the outside of the side wall 68 and retains the shaft against the clamping force applied by the gib 36 to the clamped member 32. The knob 30 is affixed to the outermost end of the shaft 38. As shown in FIG. 7, the bottom of the clamped member 32 is cut out to provide clearance for the shaft 38 and guide block 64. The shaft 38 may be partially recessed into the bottom of the clamp housing 12, as shown in FIG. 7. A slot 72 (FIG. 2) is machined into an opposite side wall 74 of the clamp housing 12 to provide clearance and lateral guidance for the gib 36. As shown in FIGS. 3 and 6, the lower part of the gib 36 has a shoulder 76 that engages a notch 78 in the clamp housing 12 and constrains the gib against upward movement during clamping.

Rotation of the shaft 38 moves the gib 36 relative to the clamp housing 12 to clamp and unclamp the head-mounting arm 16. When the clamped member 32 of the head-mounting arm 16 is clamped, as shown in FIG. 3, the beveled surfaces 48a and 48b of the clamped member 32 mate with the inclined surface 50 of the clamp housing 12 and the inclined surface 54 of the gib 36, respectively. In the clamped position, the shaft 38 pulls the gib 36 to the left, as viewed in FIG. 3. The acute angles 52 and 56 of the inclined surfaces 50 and 54 and beveled surfaces 48a and 48b force the bottom surface 42 of the clamped member 32 into intimate contact with the support surface 40a and 40b of the clamp housing 12. The mating surfaces make area contact, which secures the clamp assembly and spreads the clamping force without distorting the components.

The quick-release clamp 14 locates the head-mounting arm 16 precisely in two dimensions and within a certain tolerance in a third dimension. As best shown in FIG. 7, the quick-release clamp 14 allows for some adjustment of the clamped member 32 parallel to the clamp axis 46, but this movement is restricted by the clearance between the sides of the clamped member and the clamp housing 12 and the clearance between the underside of the clamped member and the shaft 38 and guide block 64. Tight control over the position of the clamped member 32 along the clamp axis 46 can be accomplished by reducing those clearances.

Figure 8:
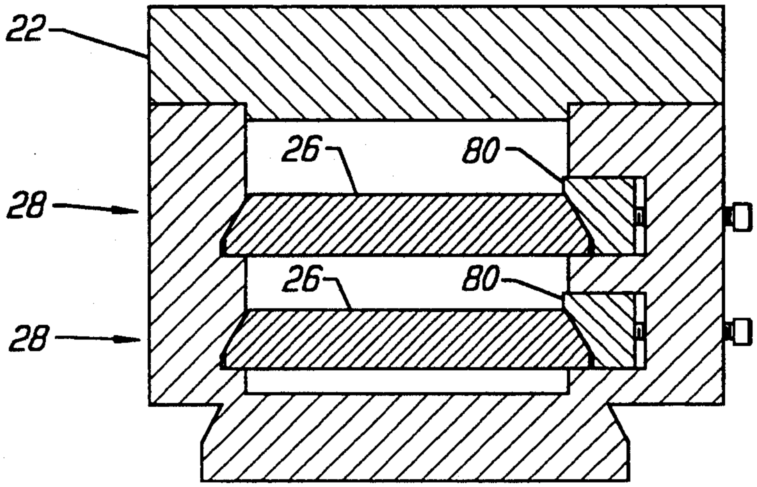
FIG. 8 is a sectional view of a headblock clamp, as taken along line 8—8 of FIG. 1.

The tongues 26 of two in-line arm assemblies 10 are shown clamped to the headblock assembly 22 in FIG. 8. Each clamp 28 of the headblock 22 has a gib 80 that clamps onto a tongue 26 of an in-line arm assembly 10.

Figure 9:
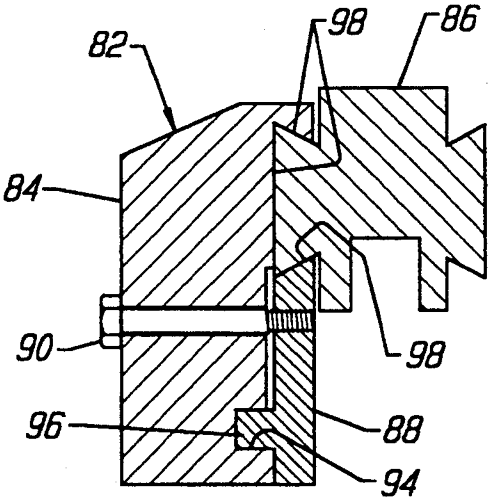
FIG. 9 is a sectional view of a head-mounting clamp of the present invention, as taken along line 9—9 of FIG. 1.

FIG. 9 illustrates a clamp 82 that is part of the head-mounting fixture 18 and is used to adjust and lock the height of the head relative to the disk-under-test. Clamp 82 has a clamp housing 84, a movable block 86, a gib 88, and a screw 90. The screw 90 is threaded into a tapped hole in the gib 88. A notch 94 in the clamp housing 84 receives a tab 96 of the gib 88. The notch 94 is larger than the tab 96 so that the gib 88 can pivot about the tab. The clamp housing 84, movable block 86, and gib 88 have mating surfaces 98 that clamp together when the screw 90 is tightened.

The movable block 86 provides a mounting (not shown) for a head used in disk certification testing. The purpose of clamp 82 is to provide a vertical adjustment for the head mounting. To adjust the vertical position of the head with respect to a disk, screw 90 is loosened, which loosens the gib 88 and allows the movable block 86 (carrying the head) to be repositioned. Then, the screw is retightened, thereby clamping the assembly in the desired position.

From the above description, it will be apparent that the invention disclosed herein provides a novel and advantageous clamping apparatus. The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. An in-line arm assembly for releasably clamping a head-mounting fixture in a disk drive component tester, said arm assembly comprising:

a clamp housing including a tongue extending from one side thereof for coupling the clamp housing to a headblock and also including a clamp portion for releasably coupling a head-mounting arm to the clamp housing in a fixed orientation, wherein the clamp portion of the clamp housing includes a recessed pocket open to a side opposite the tongue;

a movable gib coupled to the clamp housing in the pocket thereof;

a head-mounting arm including a clamped member that engages the clamp housing and the gib, wherein the head-mounting arm extends sideways from the pocket of the clamp housing when mounted in the clamp;

means for moving the gib to clamp the head-mounting arm in a fixed orientation relative to the clamp housing and to release the head-mounting arm for removal from the clamp housing; and a head-mounting fixture coupled to the head-mounting arm, wherein the head-mounting fixture includes means for adjusting the height of a head mounted thereto.

2. An in-line arm assembly as recited in claim 1 wherein the height of the clamped member of the head-mounting arm is less than or equal to the depth of the recessed pocket of the clamp housing so that an upper surface of the clamped member is no higher than an upper surface of the clamp housing when the head-mounting arm is clamped.

3. An in-line arm assembly for releasably clamping a head-mounting fixture in a disk drive component tester, said arm assembly comprising:

a clamp housing including a tongue extending from one side thereof for coupling the clamp housing to a headblock and also including a clamp portion for releasably coupling a head-mounting arm to the clamp housing, wherein the clamp portion of the clamp housing includes a recessed pocket open to a side opposite the tongue and having a support surface and a first inclined surface forming an acute angle with respect to the support surface;

a movable gib coupled to the clamp housing in the pocket thereof opposite the first inclined surface, wherein the gib has a second inclined surface forming an acute angle with respect to the support surface;

a head-mounting arm including a clamped member having a bottom surface that is parallel to and mates with the support surface of the clamp housing and having two opposing beveled surfaces that are parallel to and mate with corresponding inclined surfaces of the clamp housing and gib, wherein the head-mounting arm extends sideways from the pocket of the clamp housing when mounted in the clamp;

means for moving the gib relative to the clamp housing in a direction parallel to the support surface of the clamp housing, wherein moving the gib in one direction clamps the clamped member of the head-mounting arm between the support surface and inclined surface of the clamp housing and the inclined surface of the gib, and wherein moving the gib in another direction releases the clamped member of the head-mounting arm; and a head-mounting fixture coupled to the head-mounting arm.

4. An in-line arm assembly as recited in claim 3 wherein the height of the clamped member of the head-mounting arm is less than or equal to the depth of the recessed pocket of the clamp housing so that an upper surface of the clamped member is no higher that an upper surface of the clamp housing when the head-mounting arm is clamped.

5. An in-line arm assembly as recited in claim 3 wherein the support surface and the first inclined surface of the clamp housing, the second inclined surface of the gib, and the bottom surface and the two opposing beveled surfaces of the clamped member are all flat.

6. An in-line arm assembly as recited in claim 5 wherein the support surface and the first inclined surface of the clamp housing, the second inclined surface of the gib, and the bottom surface and the two opposing beveled surfaces of the clamped member are all parallel to a center line of the clamping apparatus.

7. An in-line arm assembly as recited in claim 3 wherein the support surface of the clamp housing is divided into two portions, with one portion disposed adjacent the first inclined surface of the clamp housing and the other portion disposed adjacent the second inclined surface of the gib.

8. An in-line arm assembly as recited in claim 3 wherein the means for moving the gib includes a threaded shaft that is rotatably coupled to the clamp housing and that extends parallel to the support surface of the clamp housing and further includes a threaded hole in the gib that mates with the threaded shaft, whereby rotation of the shaft causes linear movement of the gib.

9. An in-line arm assembly as recited in claim 8 wherein a portion of the shaft extends perpendicular to a center line of the clamping apparatus and extends outwardly of the clamp housing through a clearance hole in the first inclined surface of the clamp housing, and further comprising a knob affixed to the portion of the shaft that extends outwardly of the clamp housing, wherein the knob provides a means for gripping and turning the shaft to move the gib.

10. An in-line arm assembly as recited in claim 3 wherein the head-mounting fixture includes means for adjusting the height of a head mounted thereto.

11. An in-line arm assembly for releasably clamping a head-mounting fixture in a disk drive component tester, said arm assembly comprising:

a clamp housing including a tongue extending from one side thereof for coupling the clamp housing to a headblock and also including a clamp portion for releasably coupling a head-mounting arm to the clamp housing, wherein the clamp portion of the clamp housing includes a recessed pocket open to a side opposite the tongue and having a flat support surface and a flat first inclined surface forming an acute angle with respect to the support surface, wherein the clamp housing has a center line that is parallel to the support surface and the first inclined surface;

a movable gib coupled to the clamp housing in the pocket thereof opposite the first inclined surface, wherein the gib has a flat second inclined surface forming an acute angle with respect to the support surface, wherein the second inclined surface is parallel to the center line, and wherein the gib has a threaded hole;

a threaded shaft that is rotatably coupled to the clamp housing and that extends parallel to the support surface of the clamp housing and perpendicular to the center line, wherein a portion of the shaft extends outwardly of the clamp housing through a clearance hole in the first inclined surface of the clamp housing, and wherein the shaft mates with the threaded hole of the gib so that rotation of the shaft causes linear movement of the gib;

a knob affixed to the portion of the shaft that extends outwardly of the clamp housing and providing a means for gripping and turning the shaft to move the gib;

a head-mounting arm including a clamped member having a bottom surface that is parallel to and mates with the support surface of the clamp housing and having two opposing beveled surfaces that are parallel to and mate with corresponding inclined surfaces of the clamp housing and gib, wherein the head-mounting arm extends sideways from the pocket of the clamp housing when mounted in the clamp, and wherein the height of the clamped member of the head-mounting arm is less than or equal to the depth of the recessed pocket of the clamp housing so that an upper surface of the clamped member is no higher that an upper surface of the clamp housing when the head-mounting arm is clamped; and a head-mounting fixture coupled to the head-mounting arm.

* * * * *